United States Patent
Grundvig et al.

(10) Patent No.: US 6,490,434 B1
(45) Date of Patent: Dec. 3, 2002

(54) SYSTEMS AND METHODS FOR COMPLETING DIAGNOSTIC TESTS ON RECHARGEABLE DEVICES USING CRADLE CONTACTS

(75) Inventors: Jeffrey Paul Grundvig, Macungie; Richard Lawrence McDowell, Chalfont; Philip David Mooney, North Wales; James Skorko, Allentown, all of PA (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/386,515

(22) Filed: Aug. 31, 1999

(51) Int. Cl.[7] .............................. H04Q 7/32; H04Q 7/34
(52) U.S. Cl. ...................... 455/67.1; 455/423; 455/425; 455/572; 455/573; 455/462
(58) Field of Search .................... 455/67.1, 423, 455/424, 425, 403, 422, 550, 572, 573, 575, 127, 69, 67.4, 66, 462, 463; 320/106, 107, 109, 113, 114, 115; 324/427

(56) References Cited

U.S. PATENT DOCUMENTS

| | | | | |
|---|---|---|---|---|
| 4,736,404 A | | 4/1988 | Anglikowski et al. | |
| 5,450,617 A | * | 9/1995 | Moore | 455/127 |
| 5,500,888 A | * | 3/1996 | Chiu et al. | 455/573 |
| 5,726,636 A | * | 3/1998 | Hayes, Jr. | 455/472 |
| 5,805,667 A | * | 9/1998 | Alvarez et al. | 455/425 |
| 6,191,551 B1 | * | 2/2001 | Fischer et al. | 320/106 |
| 6,243,576 B1 | * | 6/2001 | Seike et al. | 455/423 |
| 6,259,254 B1 | * | 7/2001 | Klang | 324/427 |

* cited by examiner

Primary Examiner—William Trost
Assistant Examiner—Keith Ferguson
(74) Attorney, Agent, or Firm—Troutman Sanders LLP; John E. Curtin, Esq.

(57) ABSTRACT

Systems and methods utilize cradle contacts for completing diagnostic tests of rechargeable devices, such as cordless telephones. A cordless telephone handset or base is placed into a test fixture. Once the handset or base is cradled, diagnostic message signals are transmitted through cradle contacts in the test fixture and handset/base. The message signals may be made up of ASK signals. The beginning and end of each test may be identified by a code or codes embedded in a message signal. The use of cradle contacts to complete diagnostic tests alleviates problems associated with use of internal test access ports to carry out such tests.

77 Claims, 1 Drawing Sheet

SYSTEMS AND METHODS FOR COMPLETING DIAGNOSTIC TESTS ON RECHARGEABLE DEVICES USING CRADLE CONTACTS

BACKGROUND OF THE INVENTION

Most people who use cordless telephones are familiar with the need to recharge the battery contained within the handset. A visual inspection of most cordless telephone handsets usually reveals the presence of electrical contacts embedded in the handset. When the handset is placed into the base of a cordless telephone, the contacts form a circuit with matching contacts embedded in the base. This circuit connection is used to recharge the battery contained in the handset using a power source routed through the base. These contacts are referred to as "cradle contacts." The recharging of the handset necessarily requires an electrical current, referred to as a charging signal, to flow through the matching contacts.

During the manufacturing process both the base and handset must be tested to insure they are working properly. Additionally, handsets/bases must be tested when they are returned for servicing. Typically, once a handset has been assembled it can only be tested by removing its cover in order to access internal circuitry or by removing the battery from the battery compartment. Either way, the handset is tested by connecting a test fixture to the handset using an "internal" (i.e., not on the surface of the handset) connection. The handset may include an internal, dedicated connector called a Test Access Port ("TAP"). Once a connection has been established with a test fixture using a TAP or the like, the test fixture may send diagnostic message signals over the connection to internal processors or the like located inside the handset, e.g., digital signal processors, in order to conduct diagnostic tests.

Using internal TAPs to complete diagnostic tests is time-consuming because it requires that the handset (or base) be partially disassembled (i.e., to fix it) or partially assembled (i.e., when it is being made) to conduct the tests. Some cordless telephones have sought to solve this problem by placing the TAPs on the external surface of the handset (or base). While this may reduce the time it takes to complete the diagnostic tests, it has its drawbacks. First, placing TAPs on an external surface exposes them to a user. The risk is that the electrical contacts making up the TAPs could be damaged and rendered useless. Second, exposing TAPs results in a degradation in their conductivity over time.

Some have tried to use an RF link in order to carry out diagnostic tests. However, the production/manufacturing environment can be a harsh, frequency environment containing severe RF interference making the use of RF links impractical.

There is a need, therefore, for an improved means of completing diagnostic tests of a handset or base of a cordless telephone using a complementary test fixture/set-up.

Accordingly, it is an object of the present invention to provide for systems and methods for completing diagnostic tests of a handset or base of a rechargeable device without using internal TAPs.

Other objectives, features and advantages of the present invention will become apparent to those skilled in the art from the following description taken in conjunction with the accompanying drawings.

SUMMARY OF THE INVENTION

In accordance with the present invention there are provided systems and methods for completing diagnostic tests on rechargeable devices, such as a cordless telephone, using cradle contacts of a cordless handset or base. Using cradle contacts to complete diagnostic tests alleviates the problems associated with the cumbersome use of TAPS because the cradle contacts are located at or near the external surface of a cordless telephone handset or base.

An illustrative embodiment comprises a system which itself may comprise one or more devices such as a test fixture, cordless handset and/or cordless base. Each of these components in turn comprises cradle contacts for inputting and outputting diagnostic messages and a processor for controlling the generation, output and/or input of the diagnostic messages. The processor may comprise a digital signal processor, microprocessor or the like.

The cradle contacts of the test fixture, handset or base may alternatively comprise inductive cradle contacts while the diagnostic message signals may comprise signals not normally present during normal cradle charging, such as ASK message signals. These message signals have different frequencies than traditional charging signals. Embedded in the diagnostic message signals may be additional data which is used to insure the message signals are transmitted/received correctly, such as error checking and framing information.

In addition to cradle contacts and a processor, the test fixture, handset and/or base may also comprise a detector for separately detecting the diagnostic message signals from charging signals. This insures the two will not be confused by the processor.

In order to mark the beginning and end of a diagnostic test, the message signals may further comprise a first code or codes for indicating the beginning of a diagnostic test and/or a second code or codes for indicating the end of a diagnostic test.

The present invention and its advantages can be best understood with reference to the drawings, detailed description of the invention and claims that follow.

DETAILED DESCRIPTION OF THE INVENTION

Figure 1:
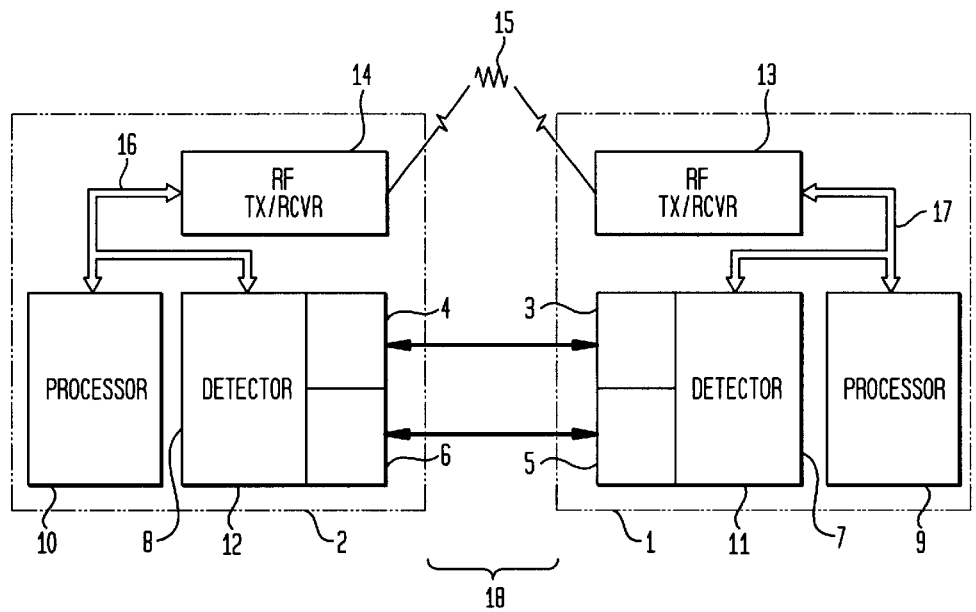
FIG. 1 depicts a system comprising a handset of a cordless telephone linked to a test fixture via charging contacts, according to one embodiment of the present invention.

Referring to FIG. 1, there is shown a block diagram of a system 18 which utilizes test fixture cradle contacts or means 4,6 and handset cradle contacts or means 3,5 to establish a link between a handset 1 and test fixture 2. Though shown as being grouped in pairs, it should be understood that the cradle contacts are not so limited. The contacts 3,5 and 4,6 may be realized as multiple contacts, i.e., two or more contacts/contact pairs. In one embodiment of the invention, the cradle contacts 3,5 and 4,6 come into physical contact with one another in order to complete a physical, electrical connection between the handset 1 and test fixture 2. In another embodiment of the invention, the cradle contacts 3,5 and 4,6 are not in physical contact with one another. Instead, the contacts establish an inductive connection or contact. In an illustrative embodiment of the invention the handset 1 comprises a cordless telephone handset though other rechargeable devices, such as a pager, etc. may be substituted. Though usually associated with a telephone, the word "handset" is not so limited. In the context of the present invention "handset" means a hand-held or mobile rechargeable, device.

It should be understood that the word "system" can be used to mean either the combination of the handset I and test fixture 2, a combination which includes a base, or only one of these components.

Normally, once the cradle contacts 3,5 of the handset 1 have been placed into contact (either physical or inductive) with the contacts 4,6 of the test fixture 2 an electrical current is generated through the pairs of contacts 3,5 and 4,6. This electrical current is referred to as a cradling signal.

This cradling signal is detected by the cradle contacts 3,5 and 4,6, respectfully. The respective cradle contacts then inform processors or processing means 9,10 via internal buses 16,17 that the handset 1 has been cradled. After it is recognized that the handset 1 is cradled both the handset 1 and test fixture 2 begins to recharge the handset 1 using charging signals via the cradle contacts 3,5 and 4,6.

This link can be used to conduct diagnostic tests. In one embodiment of the invention, the test fixture 2 transmits diagnostic message signals ("message signals") to the handset 1 by controlling the frequency of the charging signals through cradle contacts 3,5 and 4,6. As is known in the art, a message can be sent by turning a signal on or off. In one embodiment of the invention, the test fixture 2 sends messages to the handset 1 by turning the charging signal on and off at a high rate of speed. It should be understood that the diagnostic message signals must be different than normal charging or cradling signals or else the two signals may be confused. Varying the frequency of the diagnostic message signals is only one of many ways to distinguish these signals from charging or cradling signals. Other ways comprise placing a distinct message header at the beginning of each diagnostic message. Still other techniques are known in the art.

For example, the test fixture processor 10 is adapted to generate message signals and is further adapted to control the frequency of the message signals input by the cradle contacts 4,6 by controlling the signal applied to cradle contacts 4,6. It may be said that the cradle contacts 4,6 are "toggled" to generate a series of on and off signals. In one embodiment of the invention, this series of on and off signals comprises amplitude shift keying ("ASK") message signals.

The operation of the handset 1 according to one embodiment of the invention will now be described. The handset cradle contacts 3,5 receives the series of on and off message signals from the test fixture 2 via charging contacts 3,5. These signals are then decoded using means known in the art. These decoded message signals are then used to initiate diagnostic tests between the test fixture 2 and handset 1. It is now up to the handset 1 to generate message signals in response.

The handset processor 9 is similarly adapted to generate a separate set of message signals which are sent to handset cradle contacts 3,5. The processor 9 is also adapted to control the output of the message signals by cradle contacts 3,5 by, more specifically, controlling the frequency of the charging signals. As before, the charging signals can be turned on and off by the handset 1 such that a series of on and off signals forms a responsive message which is then sent to the test fixture 2.

Thus, the cradle contacts 3,5 and 4,6 serve multiple purposes; they are used to recharge the handset 1, to detect a cradled state of the handset 1 and for sending diagnostic message signals.

In alternative embodiments of the invention, the test fixture 2 and/or handset 1 are further modified to send message signals. First, test fixture detector or means 12 and handset detector or means 11 may be used to detect each type of signal; the cradling signal used to detect whether the handset is in a cradled position, charging signals and the diagnostic message signals. In one embodiment of the invention the diagnostic message signals use different frequencies or symbol periods than the cradling or charging signals. As indicated before, these signals must be distinguished from one another in order to prevent either the handset 1 or test fixture 2 from erroneously confusing cradling/charging signals with a message signal.

It should be understood that the detectors 11,12 may further comprise a filter, filters or filter means adapted to detect only one of these signals at a time. Taken together each detector and cradle contact combination comprises an input/output unit ("I/O") 7, 8.

The diagnostic message signals input or output from either the handset 1 or test fixture 2 via the cradle contacts 3,5 and 4,6 may comprise additional formatting. In one embodiment of the invention, the message signals comprise error checking and framing information which are added by means known in the art prior to transmission by the handset/test fixture. Upon being received, a message signal is appropriately deframed and verified on both a word and message basis using means known in the art. The deframing and verification helps to rid the message signal of any spurious bounces and/or partial messages.

It should be understood that the cradle contacts 3,5 comprise TAPs for testing the handset 1. During the manufacturing or servicing trouble shooting process, the handset 1 can be placed into the test fixture 2. Once the test fixture 2 detects the presence of the handset 1, by detecting a cradling signal, it sends diagnostic message signals to the handset 1 through cradle contacts 3,5 and 4,6. Thereafter the diagnostic message signals are decoded using means known in the art and sent to processor 9. Processor 9 is adapted to generate responsive message signals and controls the cradle contacts 3,5 so as to output the responsive message signals to the test fixture 2.

In some cases the handset 1 will not immediately respond to the diagnostic message signals generated by the test fixture 2. In another embodiment of the invention, the test fixture 2 waits a few seconds and then re-transmits diagnostic message signals over the charging contacts 3,5 and 4,6. In still another embodiment of the invention, the diagnostic message signals initially sent by the test fixture 2 comprises a first code designed to initiate the start of a diagnostic test between the test fixture 2 and handset 1. When the test fixture 2 has completed the transmission of diagnostic message signals, i.e. after the tests are completed, the test fixture 2 may alternatively transmit a diagnostic message signal which comprises a second code designed to inform the handset 1 that the testing process has been completed. It should be understood that the word "code" means both a single code or multiple codes.

The processors 9,10 may comprise digital signal processors, microprocessors, memory components or a combination of these devices. The functions carried out by the processors 9,10 may reside as instructions stored as program code in the processors 9,10 or in other devices known in the art.

Figure 2:
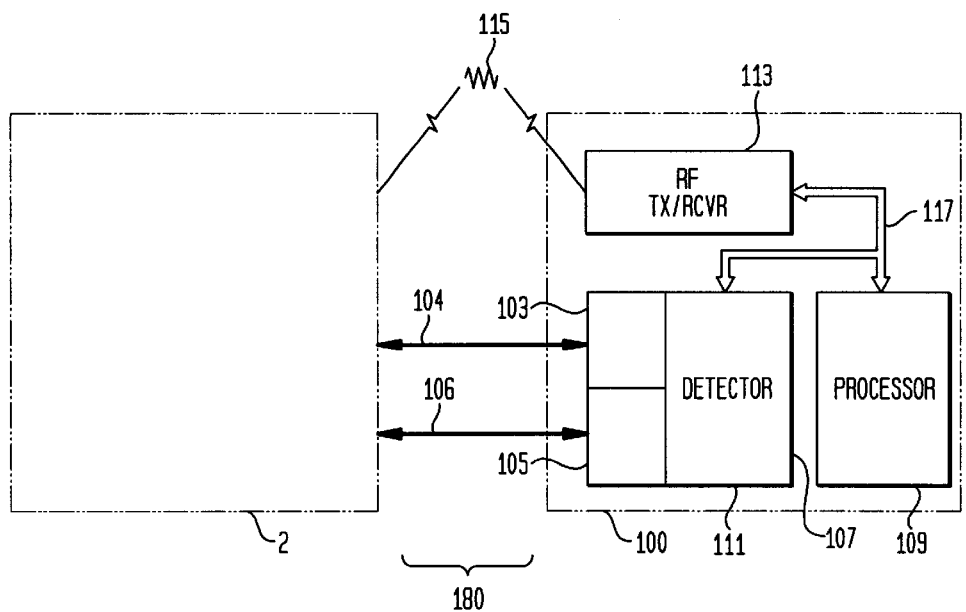
FIG. 2 depicts a system comprising a base of a cordless telephone linked to a test fixture via charging contacts according to another embodiment of the present invention.

FIG. 2 depicts another system 180 comprising a base 100 and test fixture 2. The base may be troubleshooted or tested using diagnostic message signals transmitted over cradle contacts 103,105 and 104,106.

Base processor 109, base cradle contacts 103,105 and base detector 111 function in substantially the same fashion as their counterparts which comprise handset 1 described above. In an illustrative embodiment of the present invention the base 100 comprises a cordless telephone base, though in the context of the present invention "base" means a device which is used to cradle/hold and recharge a handset.

Though the above discussion focuses on systems and devices, it should be understood that the present invention also envisions methods for carrying out diagnostic tests between a test fixture and a device using cradle contacts.

It is to be understood that changes and variations may be made without departing from the spirit and scope of this invention as defined by the claims that follow.

We claim:

1. A system for completing diagnostic tests on a rechargeable device comprising:
   a test fixture, the test fixture comprising;
   test fixture cradle contacts adapted to input and output a series of diagnostic message signals; and
   a test fixture processor adapted to control the generation, input and output of the diagnostic message signals.

2. The system as in claim 1 wherein the test fixture cradle contacts comprise inductive cradle contacts.

3. The system as in claim 1 wherein the diagnostic message signals comprise ASK message signals.

4. The system as in claim 1 wherein the diagnostic message signals comprise signals having different frequencies than charging signals.

5. The system as in claim 1 wherein the diagnostic message signals comprise error checking and framing information.

6. The system as in claim 1 further comprising a test fixture detector adapted to separately detect the diagnostic message signals from charging signals.

7. The system as in claim 1 wherein the diagnostic message signals comprise a first code for indicating a beginning of a diagnostic test.

8. The system as in claim 1 wherein the diagnostic message signals comprise a second code for indicating an end of a diagnostic test.

9. The system as in claim 1 wherein the test fixture processor comprises a digital signal processor.

10. The system as in claim 1 where the rechargeable device comprises a cordless telephone.

11. The system as in claim 1 further comprising a handset, the handset comprising:
    handset cradle contacts adapted to input and output diagnostic message signals; and
    a handset processor adapted to control the generation, input and output of the diagnostic message signals.

12. The system as in claim 11 wherein the handset cradle contacts comprise inductive cradle contacts.

13. The system as in claim 11 further comprising a handset detector adapted to separately detect the diagnostic message signals from charging signals.

14. The system as in claim 11 wherein the handset processor comprises a digital signal processor.

15. The system as in claim 11 wherein the handset cradle contacts comprise test access ports.

16. The system as in claim 11 where the handset comprises a cordless telephone handset.

17. The system as in claim 11 further comprising a base, the base comprising:
    base cradle contacts adapted to input and output the diagnostic message signals; and
    a base processor adapted to control the generation, input and output of the diagnostic message signals.

18. The system as in claim 17 wherein the base cradle contacts comprise inductive cradle contacts.

19. The system as in claim 17 further comprising a base detector adapted to separately detect the diagnostic message signals from charging signals.

20. The system as in claim 17 wherein the base processor comprises a digital signal processor.

21. The system as in claim 17 wherein the base cradle contacts comprise test access ports.

22. The system as in claim 15 wherein the base comprises a cordless telephone base.

23. The system as in claim 1 further comprising a base, the base comprising:
    base cradle contacts adapted to input and output the diagnostic message signals; and
    a base processor adapted to control the generation, input and output of the diagnostic message signals.

24. The system as in claim 23 wherein the base cradle contacts comprise inductive cradle contacts.

25. The system as in claim 23 further comprising a base detector adapted to separately detect the diagnostic message signals from charging signals.

26. The system as in claim 23 wherein the base processor comprises a digital signal processor.

27. The system as in claim 23 wherein the base cradle contacts comprise test access ports.

28. The system as in claim 23 wherein the base comprises a cordless telephone base.

29. A system for completing diagnostic tests on a rechargeable device comprising:
    a test fixture, the test fixture comprising;
    test fixture cradle contact means for inputting and outputting a series of diagnostic message signals; and
    test fixture processing means for controlling the generation, input and output of the diagnostic message signals.

30. The system as in claim 29 wherein the test fixture cradle contact means comprises inductive cradle contacts.

31. The system as in claim 29 wherein the diagnostic message signals comprise ASK message signals.

32. The system as in claim 29 wherein the diagnostic message signals comprise signals having different frequencies than charging signals.

33. The system as in claim 29 wherein the diagnostic message signals comprise error checking and framing information.

34. The system as in claim 29 further comprising test fixture detection means for separately detecting the diagnostic message signals from charging signals.

35. The system as in claim 29 wherein the diagnostic message signals comprise a first code for indicating a beginning of a diagnostic test.

36. The system as in claim 29 wherein the diagnostic message signals comprise a second code for indicating an end of a diagnostic test.

37. The system as in claim 29 wherein the test fixture processing means comprises a digital signal processor.

38. The system as in claim 29 wherein the rechargeable device comprises a cordless telephone.

39. The system as in claim 29 further comprising a handset, the handset comprising:
    handset cradle contact means for inputting and outputting the diagnostic message signals; and
    handset processing means for controlling the generation, input and output of the diagnostic message signals.

40. The system as in claim 39 wherein the handset cradle contact means comprises inductive cradle contacts.

41. The system as in claim 39 further comprising handset detection means for separately detecting the diagnostic message signals from charging signals.

42. The system as in claim 39 wherein the handset processing means comprises a digital signal processor.

43. The system as in claim 29 wherein the handset cradle contact means comprises test access ports.

44. The system as in claim 39 wherein the handset comprises a cordless telephone handset.

45. The system as in claim 34 further comprising a telephone handset base, the base comprising:

base cradle contact means for inputting and outputting the diagnostic message signals; and base processing means for controlling the generation, input and output of the diagnostic message signals.

46. The system as in claim 45 wherein the base cradle contact means comprise inductive cradle contacts.

47. The system as in claim 45 further comprising base detection means for separately detecting the diagnostic message signals from charging signals.

48. The system as in claim 45 wherein the base processing means comprises a digital signal processor.

49. The system as in claim 45 wherein the base cradle contact means comprises test access ports.

50. The system as in claim 45 wherein the base comprises a cordless telephone base.

51. The system as in claim 29 further comprising a base, the base comprising:

base cradle contact means for inputting and outputting the diagnostic message signals; and base processing means for controlling the generation, input and output of the diagnostic message signals.

52. The system as in claim 51 wherein the base cradle contact means comprises inductive cradle contacts.

53. The system as in claim 51 further comprising base detection means for separately detecting the diagnostic message signals from charging signals.

54. The system as in claim 51 wherein the base processing means comprises a digital signal processor.

55. The system as in claim 51 wherein the base cradle contact means comprise test access ports.

56. The system as in claim 51 wherein the base comprises a cordless telephone base.

57. A method for completing diagnostic tests on rechargeable devices comprising:

inputting and outputting a series of diagnostic message signals from test fixture cradle contacts; and controlling the generation, input and output of the diagnostic message signals.

58. The method as in claim 57 wherein the test fixture cradle contacts comprise inductive cradle contacts.

59. The method as in claim 57 wherein the diagnostic message signals comprise ASK message signals.

60. The method as in claim 57 wherein the diagnostic message signals comprise signals having different frequencies than charging signals.

61. The method as in claim 57 wherein the diagnostic message signals comprise error checking and framing information.

62. The method as in claim 57 further comprising separately detecting the diagnostic message signals from charging signals.

63. The method as in claim 57 wherein the diagnostic message signals comprise a first code for indicating a beginning of a diagnostic test.

64. The method as in claim 57 wherein the diagnostic message signals comprise a second code for indicating an end of a diagnostic test.

65. The method as in claim 57 wherein the device comprises a cordless telephone.

66. The method as in claim 57 further comprising:

inputting and outputting the diagnostic message signals from handset cradle contacts; and controlling the generation, input and output of the diagnostic message signals from the handset cradle contacts.

67. The method as in claim 66 wherein the handset cradle contacts comprise inductive cradle contacts.

68. The method as in claim 67 wherein the handset cradle contacts comprise test access ports.

69. The method as in claim 67 wherein the handset cradle contacts comprise cordless telephone handset cradle contacts.

70. The method as in claim 67 further comprising:

inputting and outputting the diagnostic message signals from base cradle contacts; and controlling the generation, input and output of the diagnostic message signals from the base cradle contacts.

71. The method as in claim 70 wherein the base cradle contacts comprise inductive cradle contacts.

72. The method as in claim 70 wherein the base cradle contacts comprise test access ports.

73. The method as in claim 70 wherein the base cradle contacts comprise cordless telephone base cradle contacts.

74. The method as in claim 57 further comprising:

inputting and outputting the diagnostic message signals from base cradle contacts; and controlling the generation, input and output of the diagnostic message signals from the base cradle contacts.

75. The method as in claim 74 wherein the base cradle contacts comprise inductive cradle contacts.

76. The method as in claim 74 wherein the base cradle contacts comprise test access ports.

77. The method as in claim 74 wherein the base cradle contacts comprise cordless telephone base cradle contacts.

\* \* \* \* \*